*INVENTORS*
Kikuo Kubo
Takafumi Kumagai
Takeshi Shirai

United States Patent Office 3,564,503
Patented Feb. 16, 1971

3,564,503
NUMERICAL DISPLAY SYSTEM
Kikuo Kubo and Takafumi Kumagai, Kawasaki-shi, Kanagawa-ken, and Takeshi Shirai, Tokyo, Japan, assignors to Nippon Columbia Company Limited, Tokyo, Japan, a corporation of Japan
Filed Nov. 21, 1967, Ser. No. 684,755
Claims priority, application Japan, Nov. 28, 1966, 41/78,166, 41/78,167; Mar. 8, 1967, 42/14,941
Int. Cl. G11b *13/00*
U.S. Cl. 340—172.5       9 Claims

ABSTRACT OF THE DISCLOSURE

This specification discloses a numerical display system adapted to serially display a number consisting of a plurality of digits. To this end, use is made of a plural-digit circulating type register the sequential digit numerical contents of which are decoded. A plurality of numerical indicators are sequentially driven in synchronism with the period of the register, and the contents of the digit portions of the register are sequentially indicated on that indicators which are in synchronism with the sequential driving. Furthermore, in the system disclosed in this specification, unnecessary or invalid zero or zeros are prevented from being indicated during the serial numerical display. Also, the present serial numerical display system is so designed as to indicate the decimal point. This specification also discloses a numerical indicator comprising a plurality of indicator units accommodated in a single common tube.

BACKGROUND OF THE INVENTION

This invention relates to a numerical display system capable of effecting plural-digit numerical display by the use of a numerical indicator including a plurality of numeral indicating means, and a numerical indicator applicable to such system.

The conventional numerical display system is usually of simultaneous parallel type, requiring at least ten logic circuits for each digit indicator means. Therefore, the total number of the logic circuits required becomes as great as $10 \times n$ where $n$ is the number of digits. This leads to intricacy of the entire arrangement. Disadvantageously, high power is needed, because it is required that the logic circuits corresponding to the respective digits be always made ready for operation.

Such conventional system is ordinarily arranged so that unnecessary or invalid zero or zeros are indicated. In the case where the number of effective digits is small, therefore, many invalid zeros are indicated in the more significant digit positions, which makes it difficult to read the displayed result. For this reason, arrangements have recently been developed which are so designed as to prevent invalid zero or zeros from being indicated. However, such conventional arrangements are very complicated.

In order to permit display of a number consisting of $n$ digits by the conventional system, the indicator for use therewith is constructed by the use of many indicator tubes (referred to commonly as Nixie tube) equal to the number of digits each having 10 cathodes or numerical electrodes "0", "1", "2", . . ., "9" disposed in opposing and spaced relationship with each other and a single anode common to all the cathodes. Therefore, each tube has as many as eleven external connecting leads or terminals (connections), so that the total number of the connections for the entire indicator becomes as great as $11 \times n$. This leads inevitably to intricacy of the connections of the driving circuits for the indicator. Furthermore, a special means is required for arranging the indicator tubes in such a manner that these tubes are aligned with each other. By such means, however, it is relatively difficult to secure a well-aligned arrangement. Also, difficulty is experienced in changing the direction of the entire arrangement. In addition, the over-all length of the arrangement becomes great, and manufacturing cost goes high.

SUMMARY OF THE INVENTION

Accordingly, it is the primary object of this invention to eliminate the aforementioned drawbacks of the conventional system by sequentially and serially driving plural digit numerical indicator means by the use of logic circuits common to said indicator means.

Another object of this invention is to provide a numerical display system adapted to sequentially and serially drive plural digit numerical indicator means by the use of logic circuits common to said indicator means, wherein in synchronism with the driving, detection is made of whether or not a digit is invalid zero, and if the digit is invalid zero, it is prevented from being indicated, thus eliminating the aforementioned drawbacks of the conventional system.

Still another object of this invention is to provide a numerical display system adapted to sequentially and serially drive plural digit numerical indicator means by the use of logic circuits common to said indicator means, wherein the numerical indicator means are prevented from being damaged due to fault or the like of the system of switching circuits for effecting the sequential serial driving.

A further object of this invention is to provide a numerical display system adapted to sequentially and serially drive plural digit numerical indicator means by the use of logic circuits common to said indicator means, wherein the number fo switching circuits for effecting the sequential and serial driving is greatly reduced as compared with the number of the numerical indicator means.

A further object of this invention is to provide a numerical indicator comprising a single indicator tube capable of displaying a number consisting of a plurality of digits.

A still further object of this invention is to apply a numerical indicator formed by a single indicator tube capable of displaying a number consisting of a plurality of digits to a numerical display system adapted to sequentially and serially drive plural digit numerical indicator means by the use of logic circuits common to said indicator means Other objects, features and advantages of this invention will become apparent from the following description taken in conjunction with the accompanying drawings.

DESCRIPTION OF THE PREFERRED EMBODIMENTS

In order to give better understanding of the present invention, description will first be made of the conventional numerical display system with reference to FIG. 1.

Figure 1:
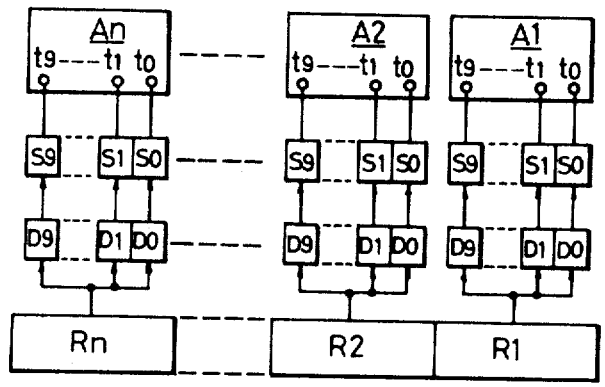
FIG. 1 is a block diagram showing the conventional numerical display system.

In FIG. 1, A1, A2, . . ., A$n$ represent 1st-digit, 2nd-digit, . . ., $n$th-digit numerical indicators, respectively. Each of these indicators is adapted for indication of the numerals 0, 1, 2, . . ., 9 and provided with terminals $t0$, $t1$, . . ., $t9$ for indicating the respective numerals (in case the indicator is a numerical indicator tube, these terminals are taken out from the numerical electrodes, and in case the indicator is a combination of lamps and numerical panels, they are taken out from the lamps). Switching circuits S0, S1, . . ., S9 are connected with the terminals $t0$, $t1$, . . ., $t9$ of each indicator, respectively. R1, R2, . . ., R$n$ denote registers associated with the numerical indicators A1, A2, . . ., A$n$, respectively. Numerical information to be displayed is stored in these registers by way of binary-coded decimal numbers. D0, D1, . . ., D9 represent decoders, which are connected with the registers R1, R2, . . ., R$n$, respectively. The switching circuits S0, S1, . . ., S9 are connected with the outputs of the decoders D0, D1, . . ., D9, respectively. Thus, the contents of the registers are decoded by the corresponding decoders into decimal numbers, and the corresponding switch circuits are operated so as to effect a numerical display corresponding to the contents of the registers.

Although not shown, for the indication of the decimal point, information concerning the position of the decimal point is stored in a decimal-point counter or register, and then it is decoded by a decoder, thereby operating a switching circuit associated with decimal-point electrode of the corresponding indicator.

As will be seen from the foregoing, the conventional numerical display system is of simultaneous parallel type, wherein ten switching circuits and ten decoders are needed for each indicator, which means that $10 \times n$ switching circuits and $10 \times n$ decoders are required as a whole where $n$ is the number of digits. This leads to intricacy of the entire arrangement and high power consumption since the decoders and switching circuits should always be kept ready for operation.

Furthermore, in the conventional system as shown in FIG. 1, no means is provided for preventing invalid zero or zeros from being indicated, and therefore in case the number of effective digits is less than the number of all the digits indicated by the indicators, difficulty will be experienced in reading the displayed result because invalid "0's" are indicated in the more significant digit positions. Of course, it is conceivable that means for preventing indication of invalid zero or zeros is combined with the arrangement shown in FIG. 1. By doing so, however, the entire arrangement will be made further complicated.

In view of the foregoing, the present invention intends to eliminate the above drawbacks by the use of such an arrangement that a plurality of numerical indicators are sequentially and serially driven. This invention will be best understood from the following detailed description made of preferred embodiments thereof with reference to FIGS. 2 to 13.

Figure 2:
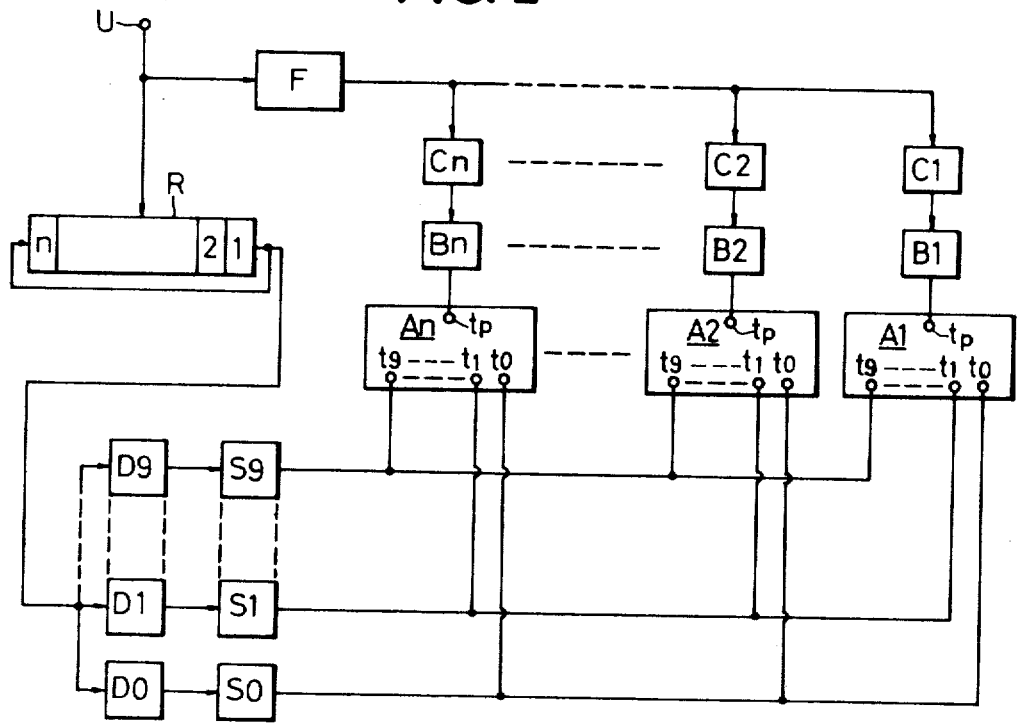
FIG. 2 is a block diagram showing the numerical display system according to an embodiment of this invention.

Referring now to FIG. 2, description will be made of the numerical display system according to a first embodiment of this invention, wherein decimal point indication is not effected. The system includes a plurality of numerical indicators A1, A2, . . ., A$n$ each having terminals $t0$, $t1$, . . ., $t9$ for indicating the numerals 0, 1, 2, . . ., 9, respectively, and a common terminal $tp$ (in case the indicator is a numerical indicator tube, the common terminal is taken out from the plate, and in case the indicator is a combination of lamps and display panels, it is taken out from the lamps connected with each other.)

The terminals $t0$, $t1$, $t2$, . . ., $t9$ of the numerical indicators A1, A2, . . ., A$n$ are correspondingly connected with each other and in turn coupled to the switching circuits S0, S1, . . ., S9, respectively. The common terminals $tp$ of the numerical indicators A1, A2, . . ., A9 are connected with switching circuits B1, B2, . . ., B$n$, respectively. There is provided a circulating-type register or shift register R the number of digits of which is equal to that of the indicators. Information represented by binary-coded decimal numbers is stored in the respective digit portions of the register R, and shift pulses are supplied from a shift pulse source U to the register R so that the numerical contents to be sequentially displayed are taken out therefrom in the order of the digits every shift pulse. Thus, the digit sequential numerical contents are supplied to the decoders D0, D1, . . ., D9 which in turn drive the switching circuits S0, S1, . . ., S9, respectively.

The shift pulses from the shift pulse source U are also supplied to a counter F. The contents of the counter F is changed every shift of the register R in synchronism with the latter so that the contents stored in that digit portion of the register R which corresponds to the contents of the counter F is taken out from the register R. The output of the counter F is supplied to decoders C1, C2, . . ., C$n$ which are adapted to drive the switching circuits B1, B2, . . ., B$n$, respectively. In this case, design is made such that when the contents stored in a certain digit portion of the register is taken out from the register R, only the decoder corresponding to that digit portion is caused to produce output. That is, when the contents stored in the 1st-digit portion of the register R is taken out from the register R, for example, only the decoder C1 is caused to produce output.

Assume that the contents of the register is the 1st-digit one. Then, only the decoder C1 is enabled to produce output by the output of the counter F, so that the switching circuit B1 is operated, thus causing the indicator A1 to produce the 1st-digit indication. If the 1st-digit contents of the register R is supplied to the decoders D0, D1, . . ., D9, and it is decimal "2," then only the decoder D2 is caused to produce output, thus driving the switching circuit S2. In this way, "2" is indicated only on the indicator A1, since the remaining indicators A2, A3, . . ., A$n$ are not ready for such indication.

Subsequently, the 2nd-digit contents of the register R will be similarly indicated only on the indicator A2.

After the $n$th-digit numerical indication has been effected, the 1st-digit numerical indication will be effected again. Repetition of such operation results in sequential serial indication of a number consisting of a plurality of digits. In this case, by selecting the repetition rate of the shift pulses to be higher than the flicker frequency, it is possible to produce apparently static indication of a number consisting of a plurality of digits.

Next, description will be made of the case where decimal point indication is effected simultaneously with the aforementioned numerical indication, with reference to FIG. 3.

Figure 3:
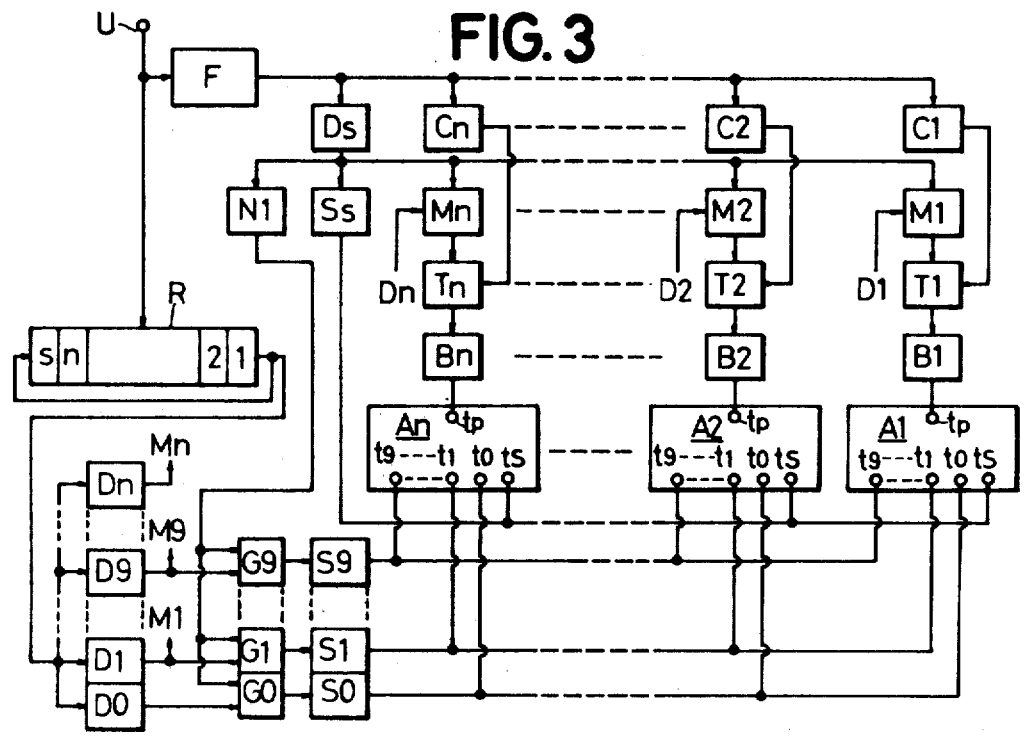
FIGS. 3 and 4 are block diagrams illustrating the numerical display system according to second and third embodiments of this invention, wherein decimal point indication can be effected, respectively.

Parts of FIG. 3 corresponding to those of FIG. 2 are indicated by the same symbols. In this case, each indicator has an additional terminal $ts$ for indicating the decimal point. The register R includes a digit portion S for storing contents representing the decimal-point position. Therefore, the register R is constructed in the form of $(n+1)$-digit circulating register, if the register as shown in FIG. 2 is $n$-digit one. For example, the register R may be arranged so that the digit portion S for storing contents representing the decimal point assumes more significant digit position than that of the $n$th-digit numerical contents.

The contents sequentially taken out of the register R are supplied to decoders D0, D1, . . ., D9. In case the number of the indicators is greater than 10 additional decoders D10, . . ., D$n$ should be provided to which are supplied the contents of the register. When the contents representing the decimal point is obtained after the 1st, 2nd, . . ., $n$th-digit output contents have been taken out of the register R as a result of the circulating operation of the latter, the contents representing the decimal point position is taken out of the counter F, and then the output of the counter is supplied to a decoder DS. On the input sides of the switching circuits S0, S1, . . ., S9 are provided AND gate circuits G0, G1, . . ., G9 each of which has one of the inputs thereof connected with each of the decoders D0, D1, . . ., D9. To the other inputs of the AND gate circuits G0, G1, . . ., G9 is coupled an inhibit circuit N1 which is connected with the decoder D$s$.

OR circuits T1, T2, . . ., T$n$ are provided on the input sides of the switching circuits B1, B2, . . ., B$n$, and each of these OR circuits has one of the inputs thereof connected with each of the decoders C1, C2, . . ., C$n$. AND circuits M1, M2, . . ., M$n$ are connected with the other inputs of the OR circuits T1, T2, . . ., T$n$, respectively. One of the inputs of each of the AND circuits M1, M2, . . ., M9 is supplied with the output of the decoder D$s$, and the other inputs of the AND circuits M1, M2, . . ., M9 are supplied with the outputs of the decoders D1, D2, . . ., D$n$, respectively. The decimal-point terminals $ts$ of the indicators A1, A2, . . ., A$n$ are connected with each other and coupled to the switching circuit S$s$, which is adapted to be driven by the output of the decoder D$s$. The other portions corresponding to FIG. 2 are the same as those described above, and therefore detailed description thereof is omitted.

With the arrangement as shown in figure, no output is produced by the decoder D$s$ during the period of time when the 1st-digit, 2nd-digit, . . ., $n$th-digit contents are being taken out from the register R, so that the gate circuits G0, G1, . . ., G9 are kept open by the output of the inhibit circuit N1, with a result that the outputs of the decoders D0, D1, . . ., D9 can be supplied to the switching circuits S0, S1, . . ., S9, respectively. In this way, during said period of time, sequential numerical display can be effected in the same manner as described above in connection with FIG. 2. When the $(j+1)$th-digit contents representing the decimal point position is taken out of the register R. Then the decoder D$n$ produces an output in case the contents representing the decimal point position is between the $(n-1)$th digit and the $n$th digit. The output of the decoder D$s$ causes the AND circuit M$n$ to produce an output which is fed through the OR circuit T$n$ to drive the switching circuit B$n$. The switching circuit S$s$ is also driven by the output of the decoder D$s$. Thus, the $n$th-digit indicator A$n$ is caused to produce decimal-point indication. In accordance with the circulation of the register R, the aforementioned operation is repeated so that a number containing the decimal point can be displayed.

Description will now be made of another example of the case where a number containing the decimal point is displayed, with reference to FIG. 4.

Figure 4:
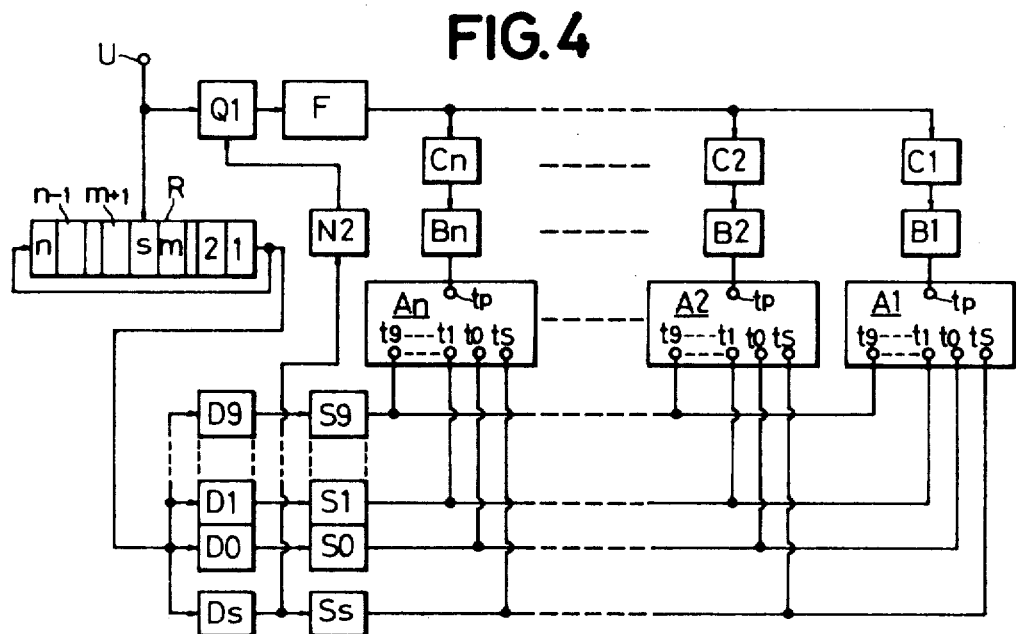

Parts of FIG. 4 corresponding to those of FIG. 2 are indicated by the same symbols. Each indicator tube has the terminal $ts$ for indicating the decimal point, as is the case with FIG. 3. Register R includes a digit portion S for storing the contents representing the decimal point, and it is constructed in the form of $(n+1)$-digit circulating type one if the register shown in FIG. 2 is $n$-digit one. The digit portion S for storing the contents representing the decimal point is positioned between the digit portion storing the $m$th-digit numerical contents and that storing the $(m+1)$th-digit numerical contents, when the decimal point is present between the $m$th digit and the $(m+1)$th digit.

The contents sequentially taken out of the register R are supplied to the decoders D0, D1, . . ., D9. In this case, there is additionally provided a decoder D$s$ for the contents representing the decimal point, and the output of the register is also supplied to the decoder D$s$. The mutually connected terminals $ts$ of the indicators A1, A2, . . ., A$n$ are connected with the switching circuits S$s$, which is driven by the output of the decoder D$s$. On the input side of the counter F is provided an AND gate circuit Q1 to one of the inputs of which are supplied the pulses from the shift pulse source U. To the other input of the gate circuit Q1 is coupled an inhibit circuit N2 to which is supplied the output of the decoder D$s$.

With the arrangement as shown in FIG. 4, the decoder D$s$ produces no output until the $m$th-digit contents is taken out of the register R, and therefore the shift pulses are supplied to counter F through the AND gate circuit Q1 because of presence of the output of the inhibit circuit N2. Thus, the same operation as described above with reference to FIG. 2 is performed. When the contents representing the decimal-point position is taken out of the register in accordance with the subsequent shift pulse, the switching circuit S$s$ is driven through the decoder D$s$. (In this case, the shift pulse is supplied to the counter through the gate circuit Q1.) Consequently, the decimal-point is indicated on the $(m+1)$th-digit indicator.

In a short time after such decimal-point indication has been achieved, the gate circuit Q1 is closed by the output of the inhibit circuit N2 during the period of time between a point of time prior to arrival of the next shift pulse and a point of time when a pulse subsequent to said next shift pulse arrives. Hence, when the subsequent shift pulse is applied to the register R so that the $(m+1)$th-digit contents is taken out therefrom, this shift pulse is not supplied to the counter F, and therefore the counter F does not count. Thus, numerical indication is produced by the $(m+1)$th-digit indicator. The $(m+2)$th and more significant digits are indicated in the same manner as described above with reference to FIG. 2. The above operation is repeated when the $n$th-digit indication is effected. In this way, a decimal number containing the decimal-point can be displayed, as described above with reference to FIG. 3.

As will be seen from what has been described above, in accordance with the present invention, it is possible to produce a sequential serial numerical display by providing logic circuits such as switching circuits and decoders common to the numerical indication terminals of all the indicators, instead of providing switching circuits and decoders for the numerical indication terminals of the respective indicators. This simplifies the entire circuit arrangement and decreases the power consumption correspondingly. Furthermore, the present invention can equally be applied to the cases where the register is composed of a delay line, magnetic cores, magnetic drum, magnetic tape or the like. In such cases, the register can be easily constructed, as compared with the cases where simultaneous parallel numerical display is effected. In case use is made of a delay line for the register, the counter may be successively driven by drive pulses corresponding to the shift pulses in synchronism with the period of the contents taken out from the register.

In case as the counter use is made of a ring counter which is in synchronism with the sequental period of the register in respect of phase, the switching circuits B1 to B$n$ may be driven by the outputs sequentially produced from the plurality of terminals of the counter, so that the decoders C1 to C$n$ may be eliminated.

Although, in the foregoing, description has been made of the case where there is no empty digit portion in the register R, this invention can equally be applied to the case where such empty digit portion exists in the register R.

As described above, the numerical indication is effected on each indicator by applying an output to the terminal $tp$ and either one of the terminals $t0$ to $t9$. Therefore, the same effect as described above can be obtained by applying to the terminals $t0$ to $t9$ the output of AND logic means to which are applied the output to be supplied to the terminal $tp$ and the output of the switching circuits S0 to S9 (the terminal $tp$ is normally connected with the power source).

The numerical display system of this invention has been fully understood from the foregoing description taken in conjunction with FIGS. 2 to 4. Further description will now be made of the embodiments of this invention adapted for preventing indication of invalid zero or zeros, with reference to FIGS. 5 and 6.

Figure 5:
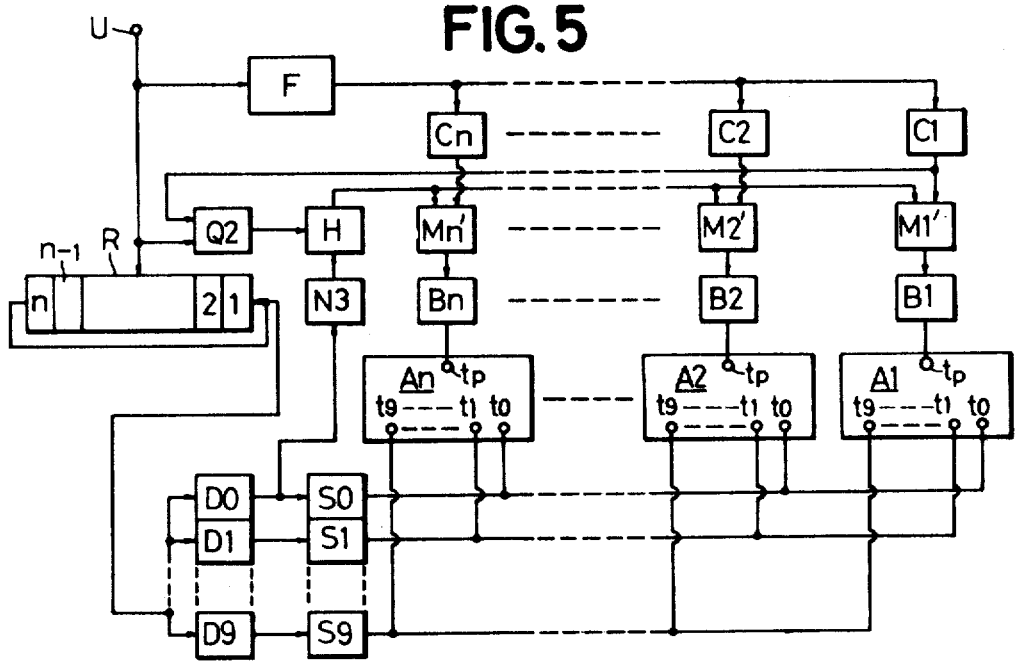
FIG. 5 is a block diagram showing the numerical display system according to a fourth embodiment of this invention, wherein no invalid zero or zeros are indicated.

Referring to FIG. 5, there are provided a plurality of numerical indicators A1, A2, . . ., A$n$, as described above with reference to FIGS. 2 to 4. Each indicator has terminals $t0$, $t1$, . . ., $t9$ for indicating the numerals 0, 1, 2, . . ., 9 respectively and a terminal $tp$ common to the terminals $t0$, $t1$, . . ., $t9$.

The terminals $t0$, $t1$, $t2$, . . ., $t9$ of the numerical indicators A1, A2, . . ., A$n$ are connected with each other and coupled to switching circuits S0, S1, . . ., S9, respectively. The common terminals $tp$ of the numerical indicators A1, A2, . . ., A$n$ are connected with switching circuits B1, B2, . . ., B$n$, respectively. There is provided a circulating register R consisting of digit portions corresponding in number to the indicators. Information represented by binary-coded decimal numbers is stored in the respective digit portions of the register R, and shift pulses are supplied from a shift pulse source U to the register R so that the numerical contents to be sequentially displayed are taken out therefrom in the order of the digits every shift pulse. Thus, the digit-sequential numerical contents are supplied to the decoders D0, D1, . . ., D9 which in turn drive the switching circuits S0, S1, . . . S9, respectively.

The shift pulses from the shift pulse source U are also supplied to a counter F. The contents of the counter F is changed every shift of the register R in synchronism with the latter so that the contents stored in that digit portion of the register R which corresponds to the contents of the counter F is taken out from the register R. The out of the counter F is supplied to decoders C1, C2, . . . C$n$. In this case, design is made such that when the contents stored a certain digit portion of the register R is taken out from the register R, only the decoder corresponding to that digit position is caused to produce output. That is, when the contents stored in the $n$th-digit portion of the register R is taken out from the register R, only the decoder C$n$ is caused to produce an output.

Each of the decoders C1, C2, . . . C$n$ is connected one of the input terminals of AND gate circuits M1', M2', . . ., M$n$' of which the outputs are connected with switching circuits B1, B2, . . ., B$n$, respectively. There are provided an AND gate circuit Q2 having one of the input terminals thereof connected with the shift pulse source U and the other input terminal connected with the decoder C1, and inhibit circuit N3 connected with the decoder D0, and a bistable circuit H adapted to be reset by the output of the gate circuit Q2 and set by the output of the inhibit circuit N3. The output of the bistable circuit H is connected with the other input terminals of the AND gate circuits M1', M2', . . . N$n$'.

In the above arrangement, assume that the contents stored in the most significant digit portion or $n$th-digit portion of the register is initially taken out from the register R, and that the bistable circuit H has been reset immediately before. Then, if the most significant digit contents of the register R is "0" (is invalid zero), the decoder D0 is enabled to produce output by which the switching circuit S0 is driven. At this time, the output of the counter F is supplied to the decoder C$n$ which is enabled to produce the output which is in turn supplied to the AND gate circuit M$n$'. In this case, since the bistable circuit H is not set through the decoder D0 and inhibit circuit N3, the switching circuit B$n$ is not driven by the AND gate circuit M$n$'. Therefore, "0" is not indicated on the $n$th-digit indicator A$n$. Subsequently, if the register R is shifted by the shift pulse from the shift pulse source U so that the ($n$—1)th-digit contents is taken out therefrom, and that contents of the register is "1," for example, then the decoder D1 is caused to produce the output by which the switching circuit S1 is driven. At this time, the output of the counter F causes the decoder C$n$—1 to produce the output which is in turn applied to the AND circuit M$n$'—1, and the switching circuit B$n$—1 is driven by the AND circuit M$n$'—1 since the bistable circuit H is set through the decoder D0-inhibit circuit N3. Thus, "1" is indicated on the ($n$—1)th-digit indicator.

The bistable circuit H is maintained in the set state irrespective of the contents taken out of the register R until the least significant digit contents is taken out therefrom as the register is successively shifted. In this way, numerical indication is successively effected by the indicators A$n$—1, . . ., A1.

When shift is made from the least significant digit to the most significant digit, the decoder C1 is caused to produce the output by which the AND gate circuit Q2 is driven so that the bistable circuit H is reset to be returned to the original state. By repetition of the above operation, numerical display can be effected without indicating invalid zero or zeros.

If all the contents from the most significant digit to the $j$th digit of the register R are "0's," then the bistable circuit H is not set until the $j$th digit is reached. Thus, "0's" are not indicated on all the indicators from the most significant digit to the $j$th digit, so that numerical display can be effected without indicating those invalid zeros.

As will be appreciated from what has been described above, in accordance with the present invention, numerical display can be effected without indicating invalid zero or zeros. Thus, by selecting the pulse repetition rate of the shift pulse source so that the period of circulation of the register R becomes shorter than the flicker period, it is possible to produce apparently static numerical display.

Description will now be made of the case where a number containing the decimal point is displayed without indicating invalid zero or zeros, with reference to FIG. 6.

Figure 6:
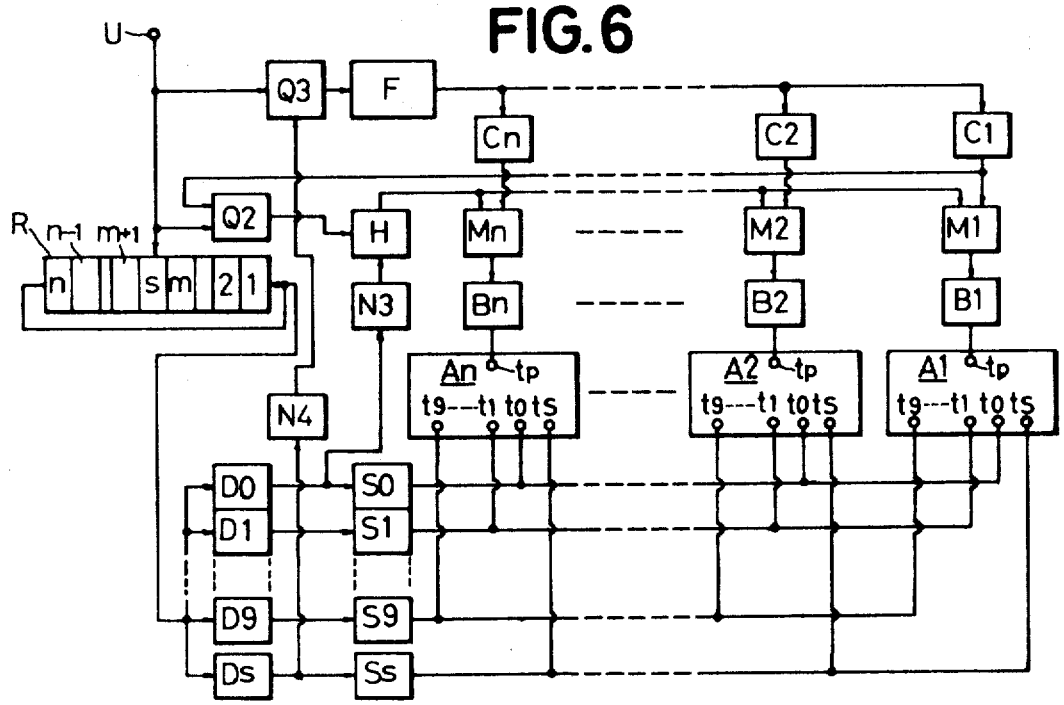
FIG. 6 is a block diagram showing the numerical display system according to a fifth embodiment of this invention, wherein no invalid zero or zeros are indicated and decimal point indication can be effected.

Parts of FIG. 6 corresponding to FIG. 5 are indicated by the same symbols. In FIG. 6, each indicator has a terminal $ts$ for indicating the decimal point. Register R includes a digit portion S for storing the contents representing the decimal point position. If the register of FIG. 5 is $n$-digit one, the register R of FIG. 6 will be constructed in the form of ($n$+1)-digit circulating type one, so that if the decimal point is present between the $m$th digit and the ($m$+1)th digit, for example, the digit portion S for storing the contents representing the decimal point position is positioned between the digit portion storing the $m$th-digit numerical contents and the digit portion storing the ($m$+1)th-digit numerical contents.

The contents sequentially taken out of the register R are supplied to the decoders D0, D1, . . ., D9. The output of the register is also supplied to an additional decoder Ds for the contents representing the decimal point. the decimal-point indicating terminals ts of the indicators A1, A2, . . ., An are connected with each other and coupled to switching circuit Ss, which is driven by the output of the decoder Ds. On the input side of the counter F is provided an AND gate circuit Q3 to one of the input terminals of which are supplied the pulses from the shift pulse source U. To other input terminal of the AND gate circuit Q3 is coupled an inhibit circuit N4 to which is supplied the output of the decoder Ds.

With the arrangement as shown in FIG. 6, no output is produced by the decoder Ds until the (m+1)th-digit contents is taken out of the register R, so that the shift pulses are applied to the counter F through the AND gate circuit Q3. Thus, the same operation as described above with reference to FIG. 5 is performed. When the contents representing the decimal-point position is taken out of the register R in accordance with the subsequent shift pulse, the gate circuit Q3 is closed by the output of the inhibit circuit N4 which is driven by the output of the decoder Ds, so that the counter F is prevented from counting. On the other hand, the switching circuit Ss is driven through the decorder Ds by the contents representing the decimal point. Thus, the decimal point is indicated on the (m+1)th-digit indicator.

When the subsequent shift pulse is applied to the register R so that the mth-digit contents is taken out therefrom, this shift pulse is also supplied to the counter F, causing the latter to count. Consequently, numerical indication is effected by the mth-digit indicator. Indication of the (m−1)th and less significant digits is effected in the same manner as described with reference to FIG. 5. After the 1st digit has been indicated, the above operation is repeated, so that a number containing the decimal point can be displayed.

In the case where the contents of the register is "0001.25," for example, it will be displayed as "1.25." Thus, numerical display containing the decimal point can be produced without indicating the invalid zeros. In the case of "0000.12," however, it will be displayed as ".12." Therefore, if it is desired that "0000.12" be displayed as "0.12," use may be made of an arrangement wherein the register is constructed in such a manner that the digit portion S storing the contents representing the decimal point is located at a position shifted by one digit from that described earlier, namely, between the digit portion storing the (m+1)th-digit numerical contents and the digit portion storing the (m+2)th-digit numerical contents, and when the contents representing the decimal-point position is taken out subsequent to the (m+2)th-digit contents, the shift pulse is counted by the counter F so that the (m+1)th-digit indicator is driven to indicate the decimal point. In this case, consideration is given to the time to control the gate circuit Q4 to prevent the counter F from counting when the subsequent contents is taken out in accordance with the subsequent shift pulse. When the next shift pulse is produced, the counter F is enabled to perform the counting function in the usual manner.

As described above, in accordance with this invention, a sequential serial numerical display can be produced without indicating invalid zero or zeros, through the use of logic circuits such as switching circuits and decoders common to the terminals for indicating the numerals of all the indicators, instead of providing switching circuits and decoders on the terminals for indicating the numerals of each indicator. Also, the arrangement is greatly simplified. Furthermore, it is quite apparent that the effect described above in connection with FIGS. 2 to 4 can be simultaneously produced by the arrangements as shown in FIGS. 5 and 6.

From the foregoing, the numerical display system of this invention has become apparent. Now, description will be made of the case where use is made of ordinary numerical indicator tubes called Nixie tubes as the aforementioned numerical indicators A1, A2, . . ., An, in relation to the switching circuits B1, B2, . . ., Bn described above.

Figure 7:
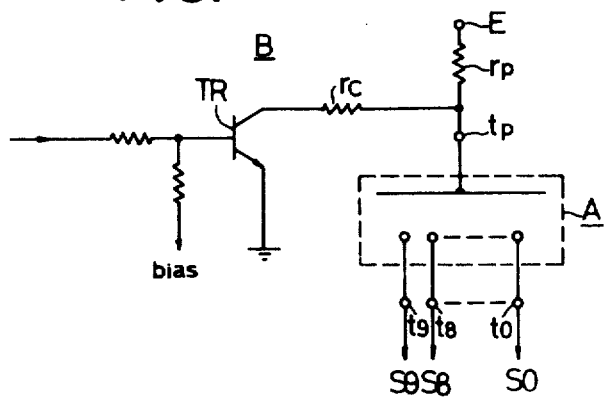
FIG. 7 is a circuit diagram showing the switching circuit for driving the numerical indicator means, which is applicable to the numerical dispaly system of this invention.

The switching circuit B (B1, B2, . . ., Bn) described above with reference to FIGS. 2 to 6 may be constructed as shown in FIG. 7. That is, the anode terminal tp of the numerical indicator tube A (A1, A2, . . ., An) is connected with a power source E (hot side) through a resistor rp, and a switching transistor TR is connected between the connection point between the resistor rp and the terminal tp and the ground (the grounded side of the power source E) through, if necessary, a resistor rc. The corresponding decoder C (C1, C2, . . ., Cn) is connected with the transistor TR in such a manner that the output thereof is supplied to the base of the transistor TR directly (in the case of FIG. 2), or through an OR circuit (in the case of FIG. 5) or AND circuit (in the case of FIGS. 4, 5 and 6). (For the convenience of explanation, description will be made herein of the case where the output of the decoder C is supplied to the transistor directly.) For example, the transistor TR is normally rendered conductive. The voltage across the resistor rp, which is lower than that maintaining the discharge of the tube A, is applied to the anode terminal tp of the tube A, thus preventing the latter from being lighted. When the transistor TR is turned off by the output of the decoder C, a sufficient voltage to cause the tube A to be lighted is impressed on the anode terminal tp of the tube, while selected one of the terminals t0 to t9 is grounded through the corresponding one of the switching circuits S0 to S9.

In an attempt to drive the numerical indicator tube A through the use of such switching circuit B, the lighting time is so short that sufficient brightness of each tube A cannot be produced, due to the fact that such tubes are lighted sequentially serially. Therefore, it is required that the constants of the switching circuit B be selected so that a relatively high discharge current is caused to flow through each tube while the latter is being lighted. This means that there will occur such possibility that an over-current is caused to flow through the tube to damage it or reduce its life span if the counter F connected with the decoder C is stopped from operation or the switching transistor TR is kept in the non-conductive state due to its fault. For such a high discharge current as to produce a sufficient brightness, it is necessary to use a relatively high voltage power source as the power source E. In addition, it is essential to use as a transistor of high breakdown voltage as the switching transistor TR.

Figure 8:
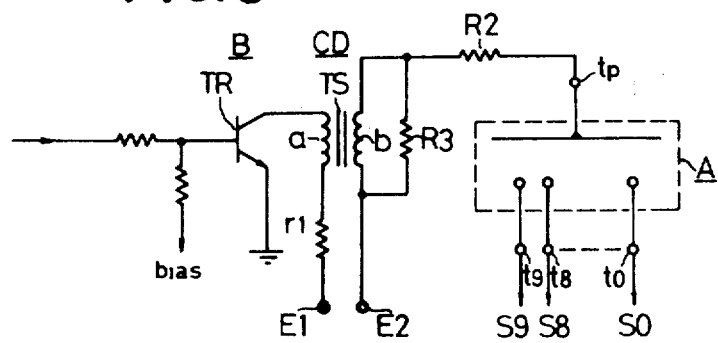
FIG. 8 is a similar circuit diagram showing a preferable example of the switching circuit for driving the numerical indicator means in the numerical display system of this invention.
Figure 9:
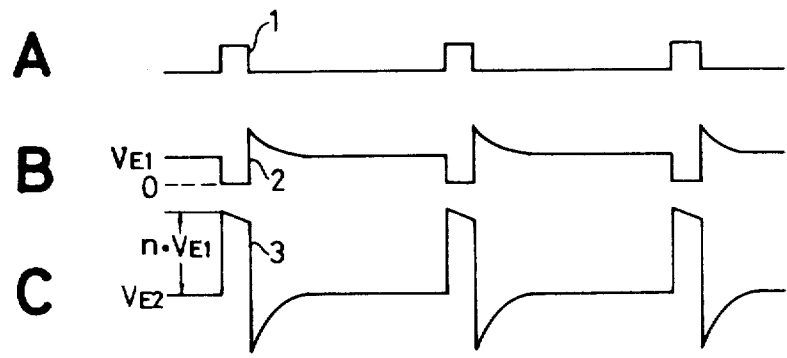
FIG. 9 is a view showing waveforms useful for explaining the circuit as shown in FIG. 8.

Consequently, it is preferable that the switching circuit B is constructed in such a manner as described below. That is, as shown in FIG. 8, the switching circuit B includes a switching transistor TR to the base of which is supplied the output of the decoder C, as described above in connection with FIG. 7. However, it is to be noted that the switching circuit B comprises a coupling circuit CD including a transformer TS having a primary winding $a$ and a secondary winding $b$. The collector of the switching transistor TR is connected with a power source E1 through the primary winding $a$ and, if necessary, a protecting resistor r1. The anode electrode tp of the numerical indicator A is connected with a power source E2 through a discharge current controlling resistor R2 and the secondary winding $b$ of the transformer TS of the coupling circuit CD. A dumping resistor R3 is connected in parallel with the secondary winding $b$ of the transformer TS. In this case, the ratio N of the turns of the primary winding to those of the secondary winding of the coupling circuit CD is selected as follows:

$$N \geq \frac{V_D - V_{E2}}{V_{E1}}$$

where $V_P$ is the discharge starting voltage of the indicator tube, and $V_{E1}$ and $V_{E2}$ are the voltages of the power sources E1 and E2, respectively.

Thus, if the switching circuit B is driven by the driving pulse output of the decoder C, the transistor TR is rendered conductive, with a result that a drive current as indicated by the reference numeral 1 in FIG. 9A flows through the primary winding $a$ of the transformer TS constituting the coupling circuit CD. Hence, the voltage at the collector of the transistor TR becomes as indicated by the reference numeral 2 in FIG. 9B, with the voltage $V_{E1}$ as the reference. Consequently, a voltage N times as high as the voltage 2 and with a polarity opposite to the latter voltage is produced across the secondary winding $b$ of the transformer TS, as indicated by the reference numeral 3 in FIG. 9C, so that the numerical indicator tube A is caused to start discharging by the pulse-like voltage. In this case, the voltage shown in FIG. 9C is obtained, with the voltage of the power source E2 as the reference, as described above. In this case, since it is required that the voltage $V_{E2}$ of the power source E2 be lower than the discharge maintaining voltage of the indicator tube A, said voltage $V_{E2}$ may be ground potential for simplification of the circuit arrangement.

The higher the voltage $V_{E2}$, the lower may be the winding ratio N of the transformer TS.

With the aforementioned arrangement, despite the fact that the counter F is stopped so that a D.C. output is produced by the decoder C and the transistor TR is kept in the conductive state, a sufficient voltage to cause discharge of the indicator tube A is merely supplied to the anode of the tube for a short period of time when the transistor TR is turned on. Thereafter, only the voltage $V_{E2}$ of the power source E2 is impressed on the anode of the tube A. Therefore, there occurs no such danger that the tube is damaged or its life span is reduced due to an over-current flowing therethrough for a long time. By increasing the winding ratio N of the transformer TS, it is not necessary to use a transistor with a high breakdown voltage as the transistor TR constituting the switching circuit B and drive such transistor at a high voltage. Therefore, there is no need to use a high voltage power source as the power source for the switching circuit.

It is to be understood that FIG. 8 shows the switching circuit B and coupling circuit CD associated therewith only by way of example. That is, the transistor TR may be of PNP or NPN type, and the polarity of the drive pulse from the decoder C and that of the power source E1 may be optionally selected, with the winding direction of the transformer TS being selected correspondingly. From this, it will become apparent to those skilled in the art that various changes and modifications become possible. Also, it will be quite obvious that the switching circuit may be formed not only by a transistor but also by any of a vacuum tube, relay or other switching element.

In the foregoing, description has been made of the preferred arrangement of the switching circuit B for the case where numerical indicator tubes are utilized as the numerical indicators for use with the system of this invention. By arranging the output lines of a plurality of switching circuits B in the form of a matrix and connecting the coupling circuits CD to the intersections of the matrix, the number of the switching circuits required can be greatly reduced as compared with the number of the numerical indicator tubes, and yet a sequential and serial numerical display can be effected. For example, when a 16-digit number is to be displayed, the number of the switching circuits can be reduced down to eight.

Figure 10:
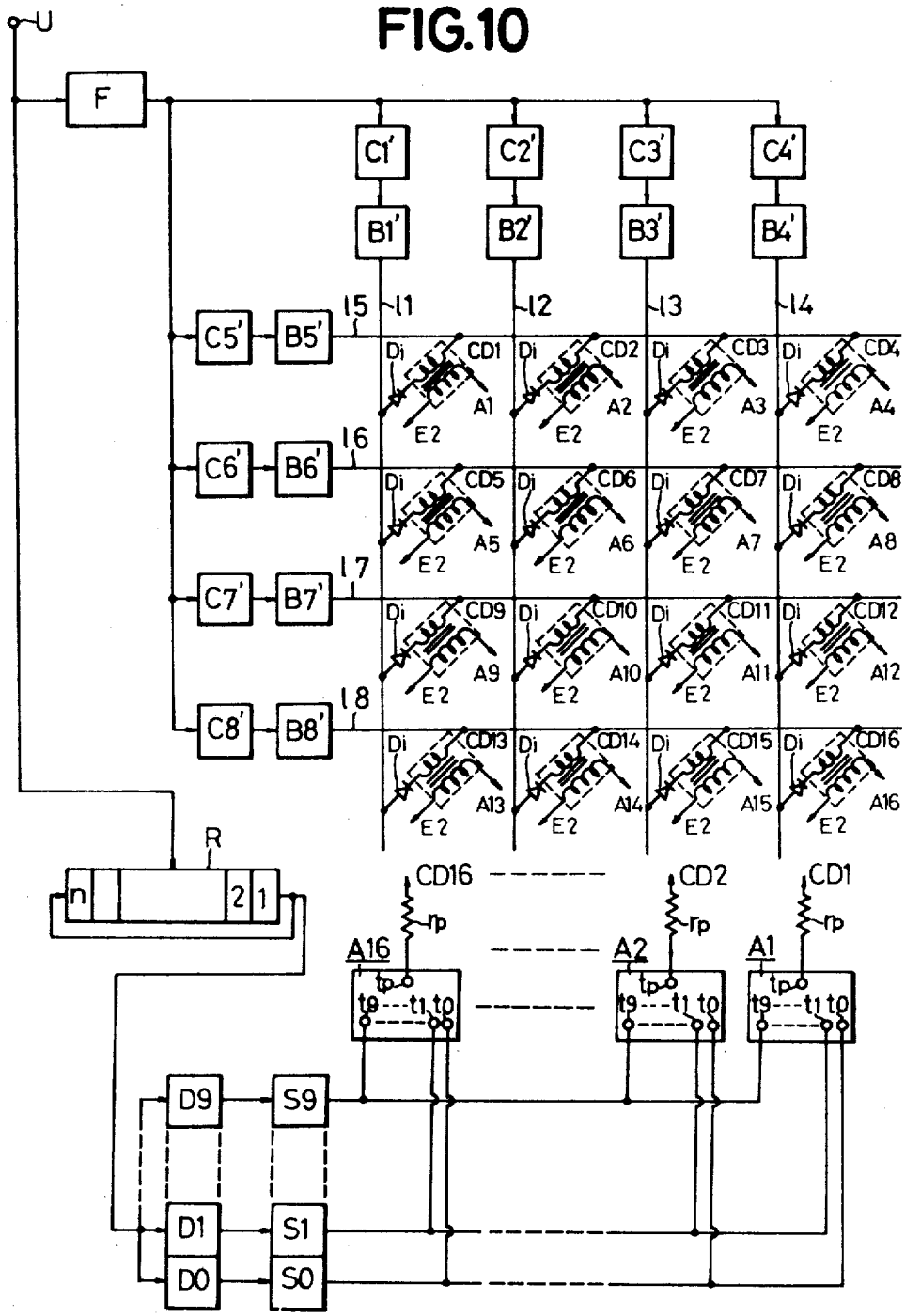
FIG. 10 is a block diagram showing the numerical display system according to a sixth embodiment of this invention, which is constructed on basis of the switching circuit as shown in FIG. 8.
Figure 11:
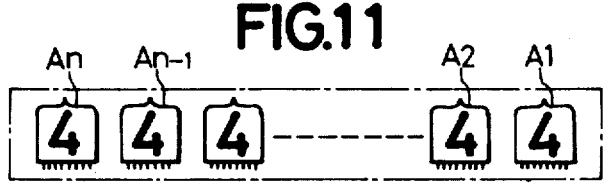
FIG. 11 is a schematic view showing an example of the conventional numerical indicator.

With reference to FIG. 10, description will be made of the case where an example of such arrangement is applied to such arrangement as shown in FIG. 2. There are provided 16 numerical indicator tubes A1 to A16. Terminals $l0$ to $l9$ of each numerical indicator tube are connected with switching circuits S0 to S9, respectively, the switching circuits S0 to S9 are driven by decoders D0 to D9 to which the contents of shift register R are supplied, and the shift register R is driven by shift pulses from shift pulse source U, as is the case with FIG. 2. In this arrangement, the output of the counter F is supplied to eight decoders C1' to C8', and switching circuits B1' to B8' are driven by the outputs of the decoders C1' to C8', respectively. Output lines $l1$ to $l4$ of the switching circuits B1' to B4' are arranged as columns, and output lines $l5$ to $l8$ of the switching circuits B5' to B8' are arranged as rows. Coupling circuits CD1 to CD16 described above are connected with the intersections between the rows $l5$ and the rows. That is, the coupling circuits CD1 to CD4 are connected with the intersections between the row $l5$ and the columns $l1$ to $l4$, respectively, the coupling circuits CD5 to CD8 are connected with the intersections between the row $l6$ and the columns $l1$ to $l4$, respectively, the coupling circuits CD9 to CD12 are connected with intersections columns $l1$ to $l4$, respectively, and the coupling circuits CD13 to CD16 are connected with the intersections between the row $l8$ and the columns $l1$ to $l4$, respectively. Such connection of each coupling circuit is made such that one end of the primary winding $a$ of the transformer TS is connected with the corresponding column and the other end with the corresponding row. (In this case, a unidirectional element $Di$ such as diode is connected in series with the primary winding $a$ of each transformer.) One end of the secondary winding $b$ of each transformer is connected with the anode terminal $tp$ of each indicator tube, and the other end with the power source E2. The switching circuit associated with each column line and that associated with each row line are designed so that when the both switching circuits are operated, a drive pulse current as described above in connection with FIG. 9A flows through the primary winding $a$ of the corresponding coupling circuit CD. Concrete circuit arrangements for such purpose will be readily apparent to those skilled in the art, and therefore detailed description thereof will be omitted.

The counter F is composed of four flip-flops with the code of "8–4–2–1." Assume that their YES outputs are F(1), F(2), F(4) and F(8), respectively, that their NOT outputs are $\overline{F(1)}$, $\overline{F(2)}$, $\overline{F(4)}$ and $\overline{F(8)}$, respectively, and that the logic functions of the decoders C1' to C8' are respectively given by $$C1'=\overline{F(1)}\cdot\overline{F(2)}$$
$$C2'=F(1)\cdot\overline{F(2)}$$
$$C3'=\overline{F(1)}\cdot F(2)$$
$$C4'=F(1)\cdot\overline{F(2)}$$
$$C5'=\overline{F(4)}\cdot\overline{F(8)}$$
$$C6'=F(4)\cdot\overline{F(8)}$$
$$C7'=\overline{F(4)}\cdot F(8)$$
$$C8'=F(4)\cdot F(8)$$

In the case the contents of the counter F is decimal "0," the NOT outputs $\overline{F(1)}$, $\overline{F(2)}$, $\overline{F(4)}$ and $\overline{F(8)}$ are produced so that the decoders C1' and C5' are caused to produce outputs by which the switching circuits B1' and B5' are driven respectively. Thus, the 1st-digit coupling circuit CD1 is driven so that the drive voltage as described above with reference to FIG. 9C is applied to the indicator tube A1, whereby the tube is made ready to be lighted. In case the contents of the counter F is "1," outputs $\overline{F(1)}$, $\overline{F(2)}$, $\overline{F(4)}$ and $\overline{F(8)}$ are produced so that the decoders C2' and C5' are caused to produce outputs driving the coupling circuit CD2, whereby the indicator tube A2 is made ready to be lighted. In this way, the coupling circuits CD3, CD4, . . ., CD16 are successively driven in the named order, and thus the indicator tubes A3, A4, . . ., A16 are successively made ready to be lighted in the named order. Then, the contents of the counter F is returned to "0," whereupon the above operation is repeated.

By using the coupling circuits each constituted by a transformer, the number of switching circuits can be greatly reduced, and yet a plurality of digits can be sequentially serially displayed to great advantage. Of course, the operational effects of the switching circuits and numerical indicator tubes described above with reference to FIG. 2 can be obtained simultaneously.

Although, in the foregoing, description has been made of the case where the coupling circuit CD is applied to the arrangement of FIG. 2, it will become apparent to those skilled in the art that such coupling circuit can equally be applied to the arrangements as shown in FIGS. 3 and 6.

Next, description will be made of the numerical indicator according to this invention. Such numerical indicator for indicating a number consisting of $n$ digits in any one of the foregoing systems according to this invention may be constructed by the use of numerical indicator tubes (referred to commonly as Nixie tube) each having 10 cathodes or numerical electrodes "0," "1," "2," . . . , "9" disposed in opposing and spaced relationship with each other and a single anode common to all the cathodes. Therefore, each tube has as many as eleven external connecting leads or terminals (connections), so that the total number of the connections for the entire indicator becomes as great as $11 \times n$. This leads inevitably to intricacy of the connections of the driving circuits for the indicator. Furthermore, a special means is required for arranging the indicator tubes so that these tubes are aligned with each other. By such means, however, it is relatively difficult to secure a well-aligned arrangement. Also, difficulty is experienced in changing the direction of the entire arrangement. In addition, the over-all length of the arrangement becomes great, and the manufacturing cost goes high.

Therefore, it is preferable to use such arrangement as described below in connection with FIGS. 12 and 13 as the numerical indicator for use with the system of this invention.

Figure 12:
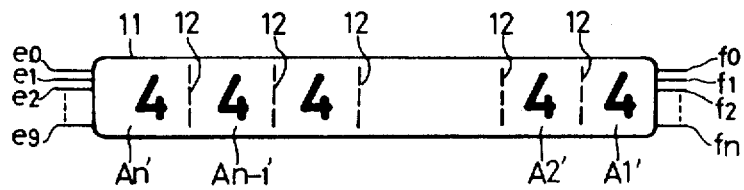
FIG. 12 is a schematic view showing the numerical indicator according to this invention.
Figure 13:
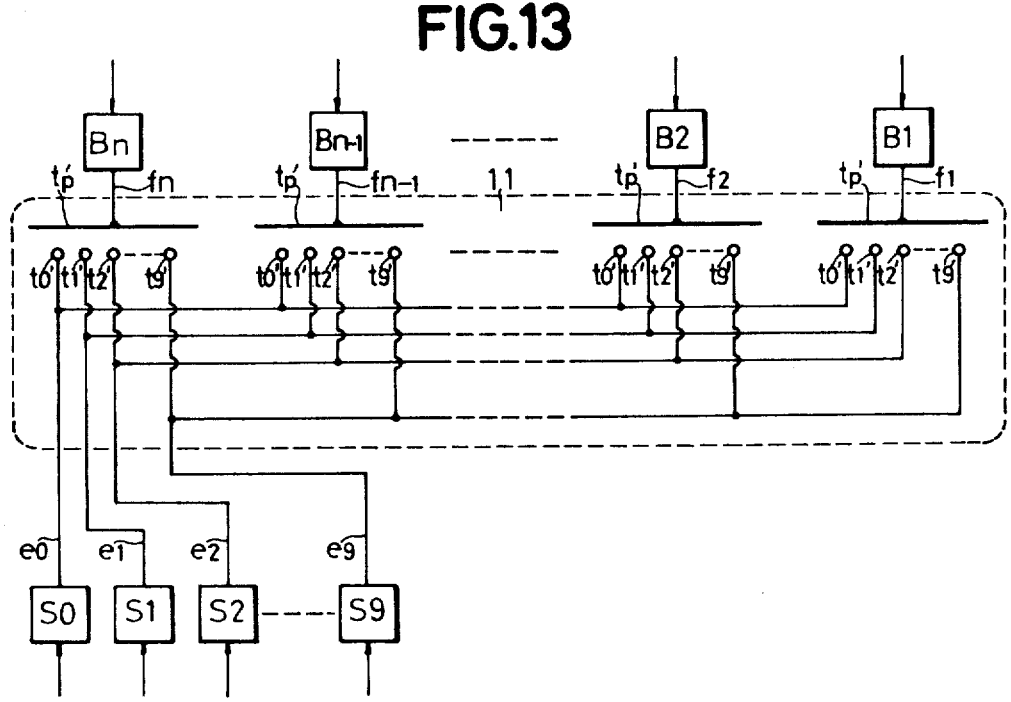
FIG. 13 is a block diagram showing the numerical display system according to a seventh embodiment of this invention utilizing the numerical indicator as shown in FIG. 12.

As shown in FIG. 12, there is prepared a tube 11 having a sufficient length to display a number consisting of a plurality of digits at least front portion of which is of light transmitting property. Within the tube 11, there are arranged 1st-digit, 2nd-digit, . . ., $n$th-digit numerical electrode groups $A1'$, $A2'$, . . ., $An'$ in the named order along the longitudinal axis of the tube. In this case, each group of numerical electrodes may be arranged in the same manner as the numerical electrode group of the conventional numerical indicator for indicating a single digit. As shown in FIG. 13, however, the numerical electrodes $t0'$, $t1'$, $t2'$, . . ., $t9'$ of the respective numerical electrode groups are correspondingly connected with each other within the tube 11, and ten connecting leads or terminals $e0$, $e1$, $e2$, . . ., $e9$ corresponding to the numerical electrodes "0," "1," "2," . . ., "9" of all the electrode groups are taken out of, for example, one end portion of the tube 11. Also, anode connecting leads or terminals $f1$, $f2$, . . ., $fn$ of the 1st-digit, 2nd-digit, . . ., $n$th-digit anodes are separately taken out of the other end portion of the tube 11. In this case, partition walls 12 are preferably provided between adjacent electrode groups.

With the above arrangement, the total number of the external connecting leads or terminals can be made as small as $10 + n$. Thus, an indicator capable of displaying a number consisting of a plurality of digits can be produced by one effort. In order to apply such numerical indicator tube to the system described above in connection with FIG. 2, the switching circuits S0, S1 . . ., S9 are connected with the numerical electrode leads or terminals $e0$, $e1$, . . ., $e9$, respectively, and the anode terminals $f1$, $f2$, . . ., $fn$ are connected with the switching circuits B1, B2, . . ., Bn, respectively. In this way, an indicator capable of displaying a number consisting of a plurality of digits can be simply produced by the use of a single indicator tube, and the total number of the connections is greatly reduced so that the connection arrangement for the driving circuits can be simplified. Also, the positions of electrodes corresponding to the respective digits are always maintained in predetermined relationship so that an excellent in-line arrangement can be secured. Therefore, no special means is required for such in-line arrangement. Also, the direction of arrangement of the entire indicator can be easily changed as desired. Furthermore, the axial length of the entire arrangement can be decreased for miniaturization of such indicator.

If the partition walls 12 are formed of an electrode material and permitted to serve as electrodes, these walls can be utilized for the purpose of indication the decimal point, positional notation or the like.

Although no decimal-point electrodes are shown in FIG. 12, it will be apparent that a decimal-point electrode can be added to each numerical electrode group.

While, in the foregoing, description has been made of the case where the indicator as shown in FIG. 12 is applied to the system of FIG. 2, it will be readily apparent to those skilled in the art that such indicator can equally be applied to the systems described above with reference to FIGS. 3 to 6.

Although this invention has been described and illustrated in detail, it is to be understood that the same is by way of explanation and example only and is not taken by way of limitation, the spirit and scope of this invention being limited only by the terms of the appended claims.

What is claimed is:

1. A numerical display system, comprising
   a plurality of numerical indicator means having respective display regions for displaying respective digits of a plural digit number, each of said numerical indicator means being provided with respective numeral selection terminals for controlling the numeral to be displayed at the display region thereof,
   a register for storing numeral-representing data with respect to each of the display regions of the numerical indicator means,
   display region selector means for controlling the selection of the display region of said numerical indicator means at which a numeral is to be displayed,
   numeral selection means connected in common to respective numeral selection terminals of the respective numerical indicator means corresponding to the same numeral for controlling the numeral to be displayed at said display regions, and responsive to numeral-representing data from the register to condition the display regions to display the numeral represented thereby,
   said numerical indicator means being responsive to the selection of a given display region by the display region selector means in conjunction with the selection of the numeral selection terminals of the respective numerical indicator means corresponding to a given numeral to display such numeral only at the given display region, and
   selection sequencing means connected to said display region selector means for sequentially activating the respective display regions thereof, and coupling said register with said numeral selection means for sequentially supplying data from said register to the numeral selection means in coordination with the sequential activation of the respective display regions so that the successive display regions display a number in accordance with the data stored in said register.

2. A system according to claim 1 wherein the selection sequencing means is operable to supply a series of shift pulses to said register to shift the numeral-representing data between successive storage positions thereof and to shift data from a predetermined storage position thereof to said numeral selection means, said selection sequencing means being operable to activate the respective display regions in step with the occurrence of the successive shift pulses.

3. A system according to claim 1 with said indicator means having respective decimal point selection terminals for activation to cause a decimal point to be displayed thereby, said register having a series of register positions for storing said numeral representing data and for storing a decimal point representing signal, and decimal point selection means connected in common with the decimal point selection terminals of the respective indicator means and responsive to the decimal poit representing signal to activate said decimal point selection-terminals, said numerical indicator means being responsive to the selection of a given display region by the display region selector means in conjunction with the activation of the decimal point selection terminals to display the decimal point at the given display region, and said selection sequencing means being operable to activate the display region at which the decimal point is to appear at the time of the readout of the decimal point representing signal from said register.

4. A system according to claim 1 with zero indication inhibiting means for detecting whether the numeral-representing data with respect to highest order display regions represent a zero or zeroes and for preventing display of such zero representing data at highest order display regions in advance of a first display region displaying a non-zero numeral.

5. A system according to claim 4 with said indicator means having respective decimal point indicating regions and said zero indication inhibiting means being operable to inhibit a series of higher order zeros while accommodating displaying of a single zero at the display region in advance of the active decimal point indicating region.

6. A numerical display system as set forth in claim 1 wherein numerical indicator tubes are used as said plurality of numerical indicator means, said display region selecting means comprise coupling circuits each composed a transformer, and the numerical indicator tubes selected by said display region selector means being energized through said coupling circuits.

7. A numerical display system as set forth in claim 1 wherein numerical indicator tubes are used as said plurality of numerical indicator means, said display region selector means comprise coupling circuits each composed of a transformer, said coupling circuits being arranged in the form of a matrix circuit, and the numerical indicator tubes selected by said display region selecting means being energized through said coupling circuits.

8. A numerical display system according to claim 1 with said numerical indicator means each including a group of a plurality of electrodes, said numerical indicator means being arranged within a single tube tube, the numerical electrodes of said numerical indicator means being correspondingly connected with each other so as to be taken out of the tube, and the common electrodes of said numerical indicator means being separately taken out of the tube.

9. A numerical indicator, comprising a plurality of numerical indicator means each including a group of a plurality of electrodes, said plurality of numerical indicator means being arranged within a single tube, the numerical electrodes of said plurlity of numerical indicator means being correspondingly connected with each other so as to be taken out of the tube, and the common electrodes of said plurality of numerical indicator means being separately taken out of the tube.

References Cited
UNITED STATES PATENTS

| | | | |
|---|---|---|---|
| 3,271,745 | 9/1966 | Schauer | 340—172.5 |
| 3,286,237 | 11/1966 | Kikuchi | 340—172.5 |
| 3,336,587 | 8/1967 | Brown | 340—324.1 |
| 3,375,498 | 3/1968 | Scuitto et al. | 340—172.5 |
| 3,388,384 | 6/1968 | Bogert et al. | 340—172.5 |
| 3,388,385 | 6/1968 | Lukes | 340—172.5 |
| 3,449,726 | 6/1969 | Kawamoto et al. | 340—172.5 |

GARETH D. SHAW, Primary Examiner

P. R. WOODS, Assistant Examiner

U.S. Cl. X.R.

340—324